No. 686,008. Patented Nov. 5, 1901.
G. A. TROMBERT.
CORK AND METHOD OF PREPARING SAME.
(Application filed June 24, 1901.)
(No Model.)

Witnesses.
Y. S. Noble
E. Hanusch.

Inventor.
George Auguste Trombert
by B. Hings Att'y.

THE NORRIS PETERS CO., PHOTO-LITHO., WASHINGTON, D. C.

UNITED STATES PATENT OFFICE.

GEORGES AUGUSTE TROMBERT, OF LYONS, FRANCE.

CORK AND METHOD OF PREPARING SAME.

SPECIFICATION forming part of Letters Patent No. 686,008, dated November 5, 1901.

Application filed June 24, 1901. Serial No. 65,843. (No specimens.)

*To all whom it may concern:*

Be it known that I, GEORGES AUGUSTE TROMBERT, a citizen of the Republic of France, residing at Lyons, France, have invented certain new and useful Improvements in Corks and Methods of Preparing the Same, of which the following is a specification.

The object of the invention is to obviate the unpleasant cork taste which interferes so injuriously with the flavor of mineral waters, wines, and other bottled goods and to prevent the introduction of cork-dust or of drops of dirty water, which often ooze out from wet corks under the compression induced by the act of corking.

The invention consists in providing the cork with two coats of the nature and applied in the manner hereinafter described.

Figure 1:
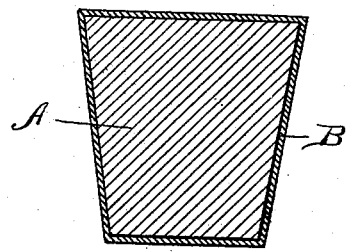
Figure 2:
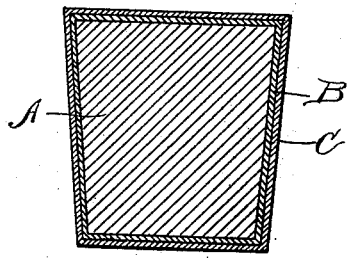

In the drawings, Figure 1 is a central longitudinal section through a cork with the primary coat applied thereto, and Fig. 2 is a like section showing the second and final coat applied over the first.

A is a cork cut to shape from the bark and coated by immersion or otherwise with one or more layers B of collodion which has been suitably combined with vaseline or vaseline-oil to render it elastic, thereby avoiding the unpleasant taste communicated when castor-oil is used for the latter purpose. A preparation of cellulose dissolved in alcohol and ether is then exposed to the air at a suitable temperature and a coat C thereof applied to the cork over the primary coating of collodion and the spirit allowed to evaporate. Experience has proved that the layer of cellulose obtained in this manner and resting upon the layer of elastic collodion resists perfectly all the pressure and alteration of shape to which it is subjected in the bottling-machine and that the cork retains indefinitely the coating thus applied and is absolutely prevented from coming in contact with the liquid and spoiling its flavor.

I claim—

1. The method herein described of preparing corks for use, consisting in first coating them with an elastic layer of collodion mixed with vaseline, then applying to said layer a coat of cellulose dissolved in alcohol and ether and allowing the spirits to evaporate, thereby depositing a permanent layer of cellulose over the elastic layer of collodion.

2. A cork having upon its surface an elastic layer of collodion and vaseline and over this a layer of cellulose.

In testimony that I claim the foregoing I have hereunto set my hand this 10th day of June, 1901.

GEORGES AUGUSTE TROMBERT.

Witnesses:
 JOACHIM COULET,
 ANTOINE GOLDBERG.